(12) United States Patent
Bidner et al.

(10) Patent No.: US 6,308,515 B1
(45) Date of Patent: Oct. 30, 2001

(54) METHOD AND APPARATUS FOR ACCESSING ABILITY OF LEAN $NO_X$ TRAP TO STORE EXHAUST GAS CONSTITUENT

(75) Inventors: David Karl Bidner, Livonia; Gopichandra Surnilla, West Bloomfield, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/528,004

(22) Filed: Mar. 17, 2000

(51) Int. Cl.[7] .................................................. F01N 3/00

(52) U.S. Cl. ............................... 60/274; 60/277; 60/285; 60/301

(58) Field of Search ............................... 60/274, 276, 277, 60/285, 301

(56) References Cited

U.S. PATENT DOCUMENTS

| | | |
|---|---|---|
| 3,696,618 | 10/1972 | Boyd et al. . |
| 3,969,932 | 7/1976 | Rieger et al. . |
| 4,033,122 | 7/1977 | Masaki et al. . |
| 4,036,014 | 7/1977 | Ariga . |
| 4,178,883 | 12/1979 | Herth . |
| 4,251,989 | 2/1981 | Norimatsu et al. . |
| 4,622,809 | 11/1986 | Abthoff et al. . |
| 4,854,123 | 8/1989 | Inoue et al. . |
| 4,884,066 | 11/1989 | Miyata et al. . |
| 4,913,122 | 4/1990 | Uchida et al. . |
| 4,964,272 | 10/1990 | Kayanuma . |
| 5,009,210 | 4/1991 | Nakagawa et al. . |
| 5,088,281 | 2/1992 | Izutani et al. . |
| 5,097,700 | 3/1992 | Nakane . |
| 5,165,230 | 11/1992 | Kayanuma et al. . |
| 5,174,111 | 12/1992 | Nomura et al. . |
| 5,189,876 | 3/1993 | Hirota et al. . |
| 5,201,802 | 4/1993 | Hirota et al. . |
| 5,209,061 | 5/1993 | Takeshima . |
| 5,222,471 | 6/1993 | Stueven . |
| 5,233,830 | 8/1993 | Takeshima et al. . |
| 5,267,439 | 12/1993 | Raff et al. . |
| 5,270,024 | 12/1993 | Kasahara et al. . |
| 5,272,871 | 12/1993 | Oshima et al. . |
| 5,325,664 | 7/1994 | Seki et al. . |
| 5,331,809 | 7/1994 | Takeshima et al. . |
| 5,335,538 | 8/1994 | Blischke et al. . |
| 5,357,750 | 10/1994 | Ito et al. . |

(List continued on next page.)

FOREIGN PATENT DOCUMENTS

| | | |
|---|---|---|
| 196 07 151 C1 | 7/1997 | (DE) . |
| 0 351 197 A1 | 1/1990 | (EP) . |
| 0 351 197 A2 | 1/1990 | (EP) . |

(List continued on next page.)

OTHER PUBLICATIONS

Allen H. Meitzler, "Application of Exhaust–Gas–Oxygen Sensors to the Study of Storage Effects in Automotive Three–Way Catalysts", SAE 800019, Feb. 25–29, 1980.

(List continued on next page.)

Primary Examiner—Thomas Denion
Assistant Examiner—Diem Tran
(74) Attorney, Agent, or Firm—Alan J. Lippa

(57) ABSTRACT

A method and apparatus for controlling the operation of a "lean-burn" internal combustion engine in cooperation with an emissions control device capable of alternatively storing and releasing an exhaust gas constituent when exposed to exhaust gases that are lean and rich of stoichiometry, respectively, determines an ability of the device to store the exhaust gas constituent by initiating a lean engine operating condition immediately following a first purge event; discontinuing the first lean engine operating condition in favor of a second purge event when the instantaneous efficiency of the device falls below a reference value; and determining the amount of excess fuel necessary to release the thus-stored amount of exhaust gas constituent.

18 Claims, 10 Drawing Sheets

U.S. PATENT DOCUMENTS

| | | |
|---|---|---|
| 5,377,484 | 1/1995 | Shimizu . |
| 5,402,641 | 4/1995 | Katoh et al. . |
| 5,410,873 | 5/1995 | Tashiro . |
| 5,412,945 | 5/1995 | Katoh et al. . |
| 5,412,946 | 5/1995 | Oshima et al. . |
| 5,414,994 | 5/1995 | Cullen et al. . |
| 5,419,122 | 5/1995 | Tabe et al. . |
| 5,423,181 | 6/1995 | Katoh et al. . |
| 5,433,074 | 7/1995 | Seto et al. . |
| 5,437,153 | 8/1995 | Takeshima et al. . |
| 5,448,887 | 9/1995 | Takeshima . |
| 5,450,722 | 9/1995 | Takeshima et al. . |
| 5,452,576 | 9/1995 | Hamburg et al. . |
| 5,472,673 | 12/1995 | Goto et al. . |
| 5,473,887 | 12/1995 | Takeshima et al. . |
| 5,473,890 | 12/1995 | Takeshima et al. . |
| 5,483,795 | 1/1996 | Katoh et al. . |
| 5,544,482 | 8/1996 | Matsumoto et al. . |
| 5,551,231 | 9/1996 | Tanaka et al. . |
| 5,577,382 * | 11/1996 | Kihara et al. ............................ 60/277 |
| 5,595,060 | 1/1997 | Togai et al. . |
| 5,598,703 | 2/1997 | Hamburg et al. . |
| 5,617,722 * | 4/1997 | Takaku .................................. 60/277 |
| 5,622,047 | 4/1997 | Yamashita et al. . |
| 5,626,014 | 5/1997 | Hepburn et al. . |
| 5,626,117 | 5/1997 | Wright et al. . |
| 5,655,363 | 8/1997 | Ito et al. . |
| 5,657,625 | 8/1997 | Koga et al. . |
| 5,693,877 | 12/1997 | Ohsuga et al. . |
| 5,713,199 | 2/1998 | Takeshima et al. . |
| 5,715,679 * | 2/1998 | Asanuma et al. ....................... 60/285 |
| 5,722,236 | 3/1998 | Cullen et al. . |
| 5,724,808 | 3/1998 | Ito et al. . |
| 5,732,554 | 3/1998 | Sasaki et al. . |
| 5,735,119 * | 4/1998 | Asanuma et al. ....................... 60/285 |
| 5,740,669 | 4/1998 | Kinugasa et al. . |
| 5,743,084 | 4/1998 | Hepburn . |
| 5,746,049 | 5/1998 | Cullen et al. . |
| 5,746,052 | 5/1998 | Kinugasa et al. . |
| 5,752,492 | 5/1998 | Kato et al. . |
| 5,771,685 | 6/1998 | Hepburn . |
| 5,771,686 | 6/1998 | Pischinger et al. . |
| 5,778,666 | 7/1998 | Cullen et al. . |
| 5,792,436 | 8/1998 | Feeley et al. . |
| 5,802,843 | 9/1998 | Kurihara et al. . |
| 5,803,048 | 9/1998 | Yano et al. . |
| 5,832,722 | 11/1998 | Cullen et al. . |
| 5,842,340 | 12/1998 | Bush et al. . |
| 5,865,027 | 2/1999 | Hanafusa et al. . |
| 5,938,715 | 8/1999 | Zang et al. . |
| 5,970,707 | 10/1999 | Sawada et al. . |
| 5,974,788 | 11/1999 | Hepburn et al. . |
| 5,974,791 | 11/1999 | Hirota et al. . |
| 5,974,793 | 11/1999 | Kinagusa et al. . |
| 5,983,627 | 11/1999 | Asik . |
| 5,992,142 | 11/1999 | Pott . |
| 5,996,338 | 12/1999 | Hirota . |
| 6,012,428 | 1/2000 | Yano et al. . |
| 6,014,859 | 1/2000 | Yoshizaki et al. . |
| 6,023,929 | 2/2000 | Ma . |
| 6,026,640 * | 2/2000 | Kato et al. ............................. 60/277 |
| 6,058,700 | 5/2000 | Yamashita et al. . |
| 6,105,365 * | 8/2000 | Deeba et al. .......................... 60/295 |
| 6,134,883 * | 10/2000 | Kato et al. ............................. 60/277 |
| 6,145,305 * | 11/2000 | Itou et al. .............................. 60/277 |
| 6,148,612 * | 11/2000 | Yamashita et al. .................... 60/277 |

FOREIGN PATENT DOCUMENTS

| | | |
|---|---|---|
| 0 444 783 A1 | 9/1991 | (EP) . |
| 0 503 882 A1 | 9/1992 | (EP) . |
| 0 580 389 A1 | 1/1994 | (EP) . |
| 62-117620 | 5/1987 | (JP) . |
| 62-97630 | 5/1987 | (JP) . |
| 64-53042 | 3/1989 | (JP) . |
| 2-30915 | 2/1990 | (JP) . |
| 2-33408 | 2/1990 | (JP) . |
| 2-207159 | 8/1990 | (JP) . |
| 3-135147 | 6/1991 | (JP) . |
| 5-26080 | 2/1993 | (JP) . |
| 5-106493 | 4/1993 | (JP) . |
| 5-106494 | 4/1993 | (JP) . |
| 6-58139 | 3/1994 | (JP) . |
| 6-264787 | 9/1994 | (JP) . |
| 7-97941 | 4/1995 | (JP) . |
| WO 98/27322 | 6/1998 | (WO) . |

OTHER PUBLICATIONS

Toshiaki Yamamoto, et al., "Dynamic Behavior Analysis of Three Way Catalytic Reaction", JSAE 882072–882166.

W.H. Holl, "Air Fuel Control to Reduce Emissions I. Engine–Emissions Relationships ", SAE 800051, Feb. 25–29, 1980.

Wei–Ming Wang, "Air–Fuel Control to Reduce Emissions II. Engine–Catalyst Characterization Under Cyclic Conditions", SAE 800052, Feb. 25–29, 1980.

Christopher D. De Boer et al., "Engineered Control Strategies for Improved Catalytic Control of $NO_x$ in Lean Burn Applications", SAE 881595, Oct. 10–13, 1988.

"An Air/Fuel Algorithm To Improve The $NO_x$ Conversion Of Copper–Based Catalysts", by Joe Theis et al, SAE Technical Paper No. 922251, Oct. 19–22, 1992, pp. 77–89.

"Effect of Air–Fuel Ratio Modulation on Conversion Efficiency of Three–Way Catalysts", By Y. Kaneko et al., Inter–Industry Emission Control Program 2 (IIEC–2) Progress Report No. 4, SAE Technical Paper No. 780607, Jun. 5–9, 1978, pp. 119–127.

"Engineered Control Strategies For Improved Catalytic Control of $NO_x$ in Lean Burn Applications", by Alan F. Diwell, SAE Technical Paper No. 881595, 1988, pp. 1–11.

* cited by examiner

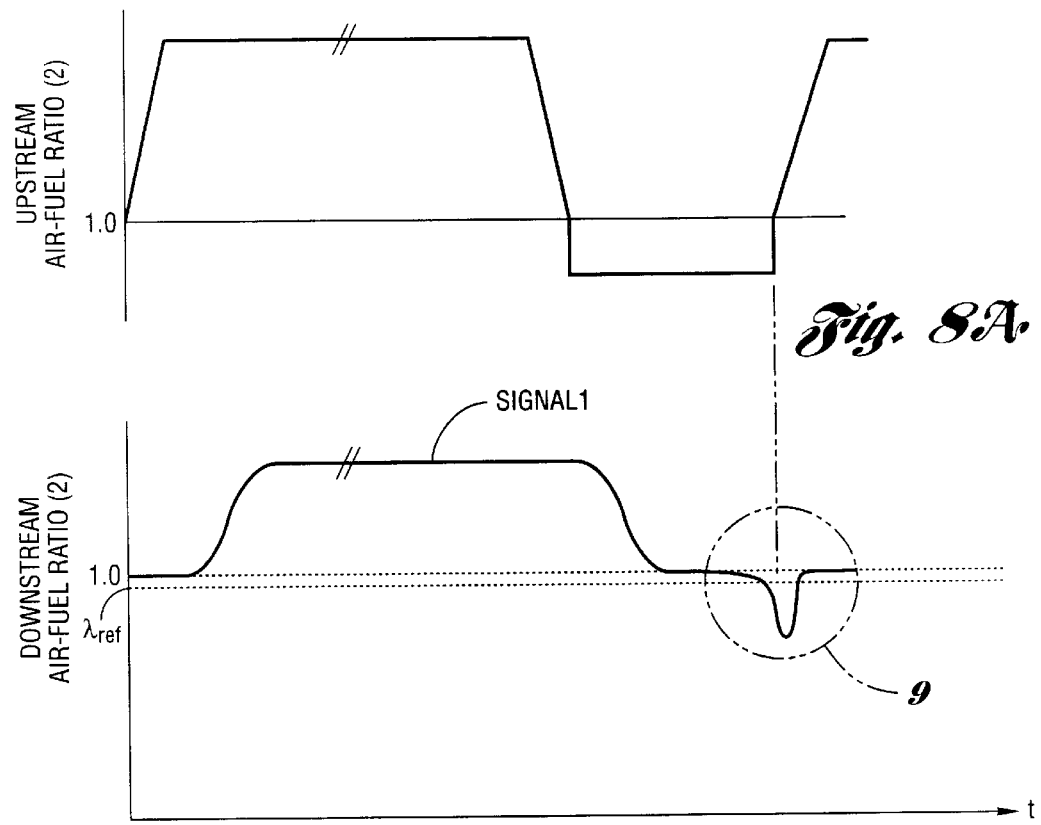
*Fig. 8A.*
*Fig. 8B.*
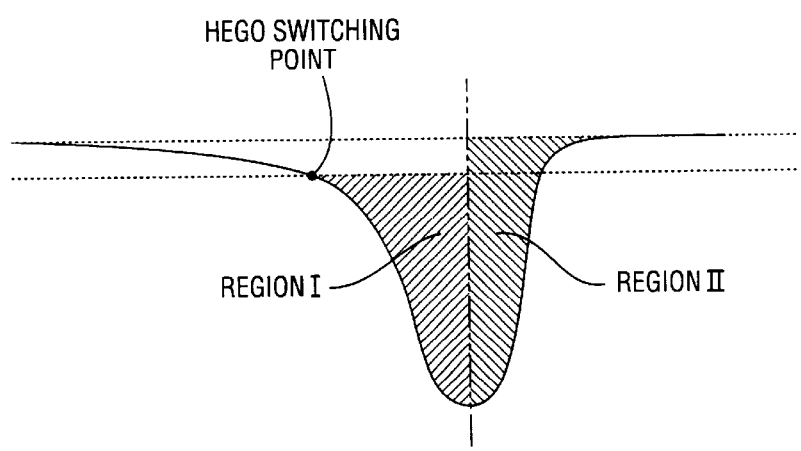
*Fig. 9*

METHOD AND APPARATUS FOR ACCESSING ABILITY OF LEAN $NO_x$ TRAP TO STORE EXHAUST GAS CONSTITUENT

BACKGROUND OF THE INVENTION

1. Field of the Invention

The invention relates to methods and apparatus for accessing the ability of a vehicle emissions control device, such as a lean $NO_x$ trap, to releasably store an exhaust gas constituent.

2. Background Art

The exhaust gas generated by a typical internal combustion engine, as may be found in motor vehicles, includes a variety of constituent gases, including hydrocarbons (HC), carbon monoxide (CO), nitrogen oxides ($NO_x$) and oxygen ($O_2$). The respective rates at which an engine generates these constituent gases are typically dependent upon a variety of factors, including such operating parameters as air-fuel ratio (8), engine speed and load, engine temperature, ambient humidity, ignition timing ("spark"), and percentage exhaust gas recirculation ("EGR"). The prior art often maps values for instantaneous engine-generated or "feedgas" constituents, such as HC, CO and $NO_x$, based, for example, on detected values for instantaneous engine speed and engine load (the latter often being inferred, for example, from intake manifold pressure).

To limit the amount of feedgas constituents that are exhausted through the vehicle's tailpipe to the atmosphere as "emissions," motor vehicles typically include an exhaust purification system having an upstream and a downstream three-way catalyst. The downstream three-way catalyst is often referred to as a $NO_x$ "trap". Both the upstream and downstream catalyst store $NO_x$ when the exhaust gases are "lean" of stoichiometry and releases previously-stored $NO_x$ for reduction to harmless gases when the exhaust gases are "rich" of stoichiometry.

More specifically, in a typical embodiment, the trap chemically stores $NO_x$ during lean-burn operation using alkaline metals, such as barium and/or strontium, in the form of a washcoat. The $NO_x$ (NO and $NO_2$) are stored in the trap in the form of barium nitrate, for example. The washcoat also includes precious metals, such as platinum and palladium, which operate to convert NO to $NO_2$ for storage in the trap as a nitrate. The trap's washcoat typically also includes ceria, whose affinity for oxygen storage is such that, during initial lean engine operation, a quantity of the excess oxygen flowing through the trap is immediately stored in the trap. The amount of stored oxygen is essentially fixed, although it begins to lessen over time due to such factors as increased trap sulfurization (sulfur accumulation) and trap aging.

The trap's actual capacity to store $NO_x$ is finite and, hence, in order to maintain low tailpipe $NO_x$ emissions when running "lean," the trap must be periodically cleansed or "purged" of stored $NO_x$. U.S. Pat. No. 5,473,887 teaches the purging of a $NO_x$ trap by subjecting the trap to an air-fuel mixture whose air-fuel ratio is rich of stoichiometric, for example, an air-fuel ratio of less than about 13. During the purge event, excess feedgas HC and CO, which are initially consumed in the three-way catalyst to release stored oxygen, ultimately "break through" the three-way catalyst and enter the trap, whereupon the trap's barium nitrate decomposes into $NO_2$ for subsequent conversion by the trap's precious metals into harmless $N_2$ and $O_2$. The oxygen previously stored in the trap is also released during an initial portion of the purge event after the HC and CO break-through the three-way catalyst.

Because a finite amount of excess fuel is required during the trap purge to release the stored oxygen before stored $NO_x$ is released, the prior art has sought to estimate the amount of oxygen stored in the trap by inferring oxygen storage from the time period between combustion, immediately after a rich purge event, of a lean air-fuel mixture within the engine and the switching of the downstream air-fuel ratio from a near-stoichiometric air-fuel ratio to a lean air-fuel ratio, as measured by a downstream oxygen sensor. However, because a significant portion of the time period between the commencement of lean engine operation and the switching of the downstream sensor is caused by movement of the resulting lean exhaust gas through the vehicle's exhaust system, both upstream and downstream of the trap, the prior art teaches an involved process for separating out the resulting time lags from the overall period, in an attempt to obtain an accurate measure of oxygen storage. Changes in the engine operating condition, i.e., the engine's speed and load, during this period renders the determination of the trap's oxygen storage capacity increasingly problematic.

Therefore, a need exists for a method and apparatus for accessing the ability of an emissions control device, such as a lean $NO_x$ trap, to releasably store an exhaust gas constituent.

SUMMARY OF THE INVENTION

It is an object of the invention to provide a method and apparatus for accessing the ability of a emissions control device for a lean-burn engine to releasably store an exhaust gas constituent.

In accordance with the invention, a method is provided for accessing the ability of an emissions control device to releasably store a quantity of a constituent of exhaust gas generated by lean-burn operation of an internal combustion engine. The method includes determining that the engine is operating at a first lean operating condition immediately following a first rich engine operating condition, the first rich engine operating condition having been sufficient to release substantially all of the previously-stored amount of the exhaust gas constituent from the device. The method further includes determining, during the first lean operating condition, a first measure representative of the instantaneous efficiency of the device to remove the exhaust gas constituent from the exhaust gas; and initiating a second rich operating condition when the third measure falls below a reference value, the subsequent rich operating condition being characterized by the combustion of a quantity of fuel in excess of a stoichiometric quantity of fuel sufficient to release substantially all previously-stored exhaust gas constituent from the device. The method further includes determining an ability of the device based on the quantity of excess fuel used in the second rich operating condition to release substantially all previously-stored exhaust gas constituent from the device.

In an exemplary method, determination of the first measure representative of the instantaneous efficiency of the device includes determining a second measure representative of the content of the exhaust gas constituent in exhaust gas entering the device, for example, using a look-up table based upon at least one of the group consisting of engine speed and engine load; and determining a third value representative of the content of the exhaust gas constituent in exhaust gas exiting the device, for example, based upon a signal, generated by a suitable sensor, representative of a detected concentration of the exhaust gas constituent in the exhaust gas exiting the device. The exemplary method further includes calculating the first measure based on the second and third measure, for example, by dividing the third measure by the second measure.

In accordance with another feature of the invention, wherein the reference value is preferably significantly greater than a minimum value necessary to maintain the content of the exhaust gas constituent in the exhaust gas exiting the trap below a predetermined threshold level. In this manner, the invention advantageously avoids "saturation" of the device when determining the device's ability to store the exhaust gas constituent, thereby avoiding unnecessary tailpipe constituent emissions. In an exemplary method, the reference value represents an efficiency of no less than about sixty-five percent.

Under the invention, a controller is also provided for controlling an engine operating in combination with an emissions control device that releases a previously-stored first exhaust gas constituent when the engine is operated at a rich operating condition for a predetermined duration. The controller is arranged to determine that the engine is operating at a lean operating condition immediately following a rich engine operating condition, the rich engine operating condition having been sufficient to release substantially all of the previously-stored amount of the exhaust gas constituent from the device. The controller is further arranged to determine a first measure representative of the instantaneous efficiency of the device to remove the exhaust gas constituent from the exhaust gas, and to initiate a subsequent rich operating condition when the third measure falls below a reference value, the subsequent rich operating condition being characterized by the combustion of a quantity of fuel in excess of a stoichiometric quantity of fuel sufficient to release substantially all previously-stored exhaust gas constituent from the device. The controller is further arranged to determine an ability of the device based on the quantity of excess fuel.

Other objects, features and advantages of the present invention are readily apparent from the following detailed description of the best mode for carrying out the invention when taken in connection with the accompanying drawings.

BRIEF DESCRIPTION OF THE DRAWINGS

FIGS. 8A and 8B are related plots respectively illustrating a single exemplary trap fill/purge cycle;

FIG. 9 is an enlarged view of the portion of the plot of FIG. 8B illustrated within circle 9 thereof;

DETAILED DESCRIPTION OF THE PREFERRED EMBODIMENT

Figure 1:
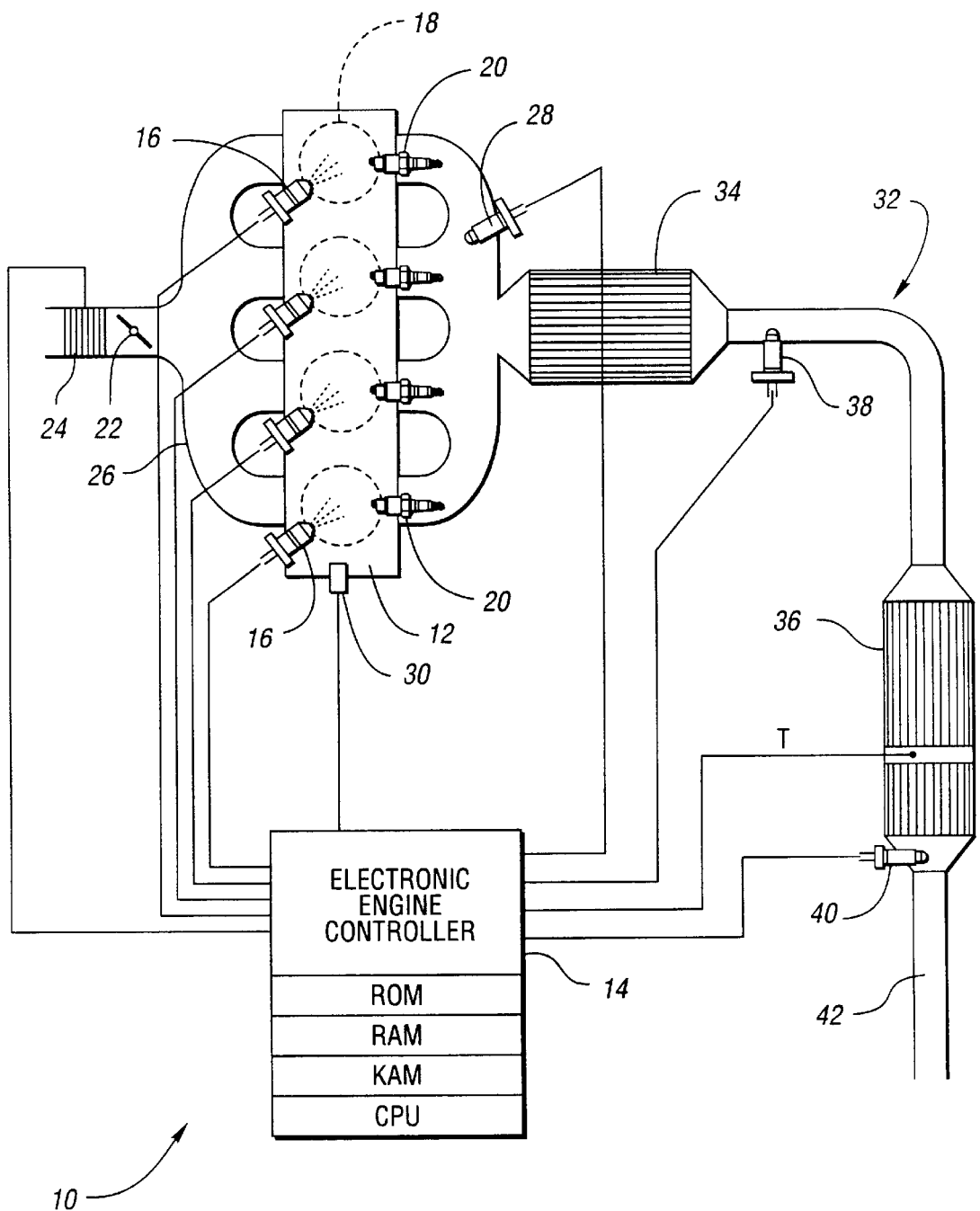
FIG. 1 is a schematic of an exemplary system for practicing the invention.

Referring to FIG. 1, an exemplary control system 10 for a gasoline-powered internal combustion engine 12 of a motor vehicle includes an electronic engine controller 14 having a processor ("CPU"); input/output ports; an electronic storage medium containing processor-executable instructions and calibration values, shown as read-only memory ("ROM") in this particular example; random-access memory ("RAM"); "keep-alive" memory ("KAM"); and a data bus of any suitable configuration. The controller 14 receives signals from a variety of sensors coupled to the engine 12 and/or the vehicle as described more fully below and, in turn, controls the operation of each of a set of fuel injectors 16, each of which is positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake to the engine's intake manifold 26, provides a signal MAF representing the air mass flow resulting from positioning of the engine's throttle 22. The air flow signal MAF from the air mass flow sensor 24 is utilized by the controller 14 to calculate an air mass value AM which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio ($\lambda$=1.00). A plurality of other sensors, indicated generally at 30, generate additional signals including an engine speed signal N and an engine load signal LOAD in a known manner, for use by the controller 14. It will be understood that the engine load sensor 30 can be of any suitable configuration, including, by way of example only, an intake manifold pressure sensor, an intake air mass sensor, or a throttle position/angle sensor.

An exhaust system 32 receives the exhaust gas generated upon combustion of the air-fuel mixture in each cylinder 18. The exhaust system 32 includes a plurality of emissions control devices, specifically, an upstream three-way catalytic converter ("three-way catalyst 34") and a downstream $NO_x$ trap 36. The three-way catalyst 34 contains a catalyst material that chemically alters the exhaust gas in a known manner. The trap 36 alternately stores and releases amounts of engine-generated $NO_x$, based upon such factors, for example, as the intake air-fuel ratio, the trap temperature T (as determined by a suitable trap temperature sensor, not shown), the percentage exhaust gas recirculation, the barometric pressure, the relative humidity of ambient air, the instantaneous trap "fullness," the current extent of "reversible" sulfurization, and trap aging effects (due, for example, to permanent thermal aging, or to the "deep" diffusion of sulfur into the core of the trap material which cannot subsequently be purged). A second oxygen sensor 38, positioned immediately downstream of the three-way catalyst 34, provides exhaust gas oxygen content information to the controller 14 in the form of an output signal SIGNAL0. The second oxygen sensor's output signal SIGNAL0 is useful in optimizing the performance of the three-way catalyst 34, and in characterizing the trap's $NO_x$-storage ability in a manner to be described further below.

The exhaust system 32 further includes a $NO_x$ sensor 40 positioned downstream of the trap 36. In the exemplary embodiment, the $NO_x$ sensor 40 generates two output signals, specifically, a first output signal SIGNAL1 that is representative of the instantaneous oxygen concentration of the exhaust gas exiting the vehicle tailpipe 42, and a second output signal SIGNAL2 representative of the instantaneous $NO_x$ concentration in the tailpipe exhaust gas, as taught in U.S. Pat. No. 5,953,907. It will be appreciated that any suitable sensor configuration can be used, including the use of discrete tailpipe exhaust gas sensors, to thereby generate the two desired signals SIGNAL1 and SIGNAL2.

Generally, during vehicle operation, the controller 14 selects a suitable engine operating condition or operating mode characterized by combustion of a "near-stoichiometric" air-fuel mixture, i.e., one whose air-fuel ratio is either maintained substantially at, or alternates generally about, the stoichiometric air-fuel ratio; or of an air-fuel mixture that is either "lean" or "rich" of the near-stoichiometric air-fuel mixture. A selection by the controller 14 of "lean burn" engine operation, signified by the setting of a suitable lean-burn request flag LB_RUNNING_FLG to logical one, means that the controller 14 has determined that conditions are suitable for enabling the system's lean-burn feature, whereupon the engine 12 is alternatingly operated with lean and rich air-fuel mixtures for the purpose of improving overall vehicle fuel economy. The controller 14 bases the selection of a suitable engine operating condition on a variety of factors, which may include determined measures representative of instantaneous or average engine speed/engine load, or of the current state or condition of the trap (e.g., the trap's $NO_x$-storage efficiency, the current $NO_x$ "fill" level, the current $NO_x$ fill level relative to the trap's current $NO_x$-storage capacity, the trap's temperature T, and/or the trap's current level of sulfurization), or of other operating parameters, including but not limited to a desired torque indicator obtained from an accelerator pedal position sensor, the current vehicle tailpipe $NO_x$ emissions (determined, for example, from the second output signal SIGNAL2 generated by the $NO_x$ sensor 40), the percent exhaust gas recirculation, the barometric pressure, or the relative humidity of ambient air.

Figure 2:
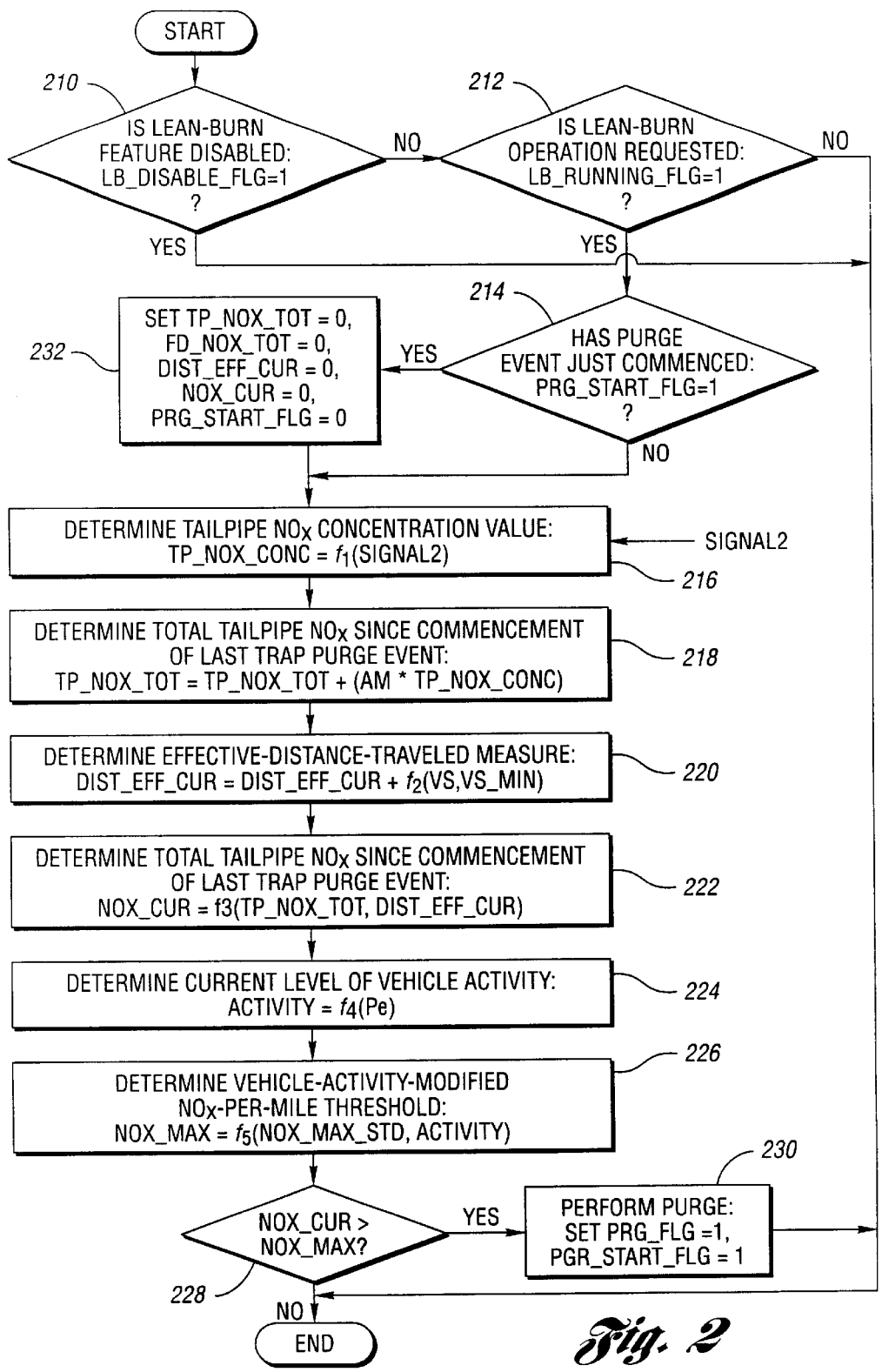
FIGS. 2–7 are flow charts depicting exemplary control methods used by the exemplary system.

Referring to FIG. 2, after the controller 14 has confirmed at step 210 that the lean-burn feature is not disabled and, at step 212, that lean-burn operation has otherwise been requested, the controller 14 conditions enablement of the lean-burn feature, upon determining that tailpipe $NO_x$ emissions as detected by the $NO_x$ sensor 40 do not exceed permissible emissions levels. Specifically, after the controller 14 confirms that a purge event has not just commenced (at step 214), for example, by checking the current value of a suitable flag PRG_START_FLG stored in KAM, the controller 14 determines an accumulated measure TP_NOX_TOT representing the total tailpipe $NO_x$ emissions (in grams) since the start of the immediately-prior $NO_x$ purge or desulfurization event, based upon the second output signal SIGNAL2 generated by the $NO_x$ sensor 40 and determined air mass value AM (at steps 216 and 218). Because, in the exemplary system 10, both the current tailpipe emissions and the permissible emissions level are expressed in units of grams per vehicle-mile-traveled to thereby provide a more realistic measure of the emissions performance of the vehicle, in step 220, the controller 14 also determines a measure DIST_EFF_CUR representing the effective cumulative distance "currently" traveled by the vehicle, that is, traveled by the vehicle since the controller 14 last initiated a $NO_x$ purge event.

While the current effective-distance-traveled measure DIST_EFF_CUR is determined in any suitable manner, in the exemplary system 10, the controller 14 generates the current effective-distance-traveled measure DIST_EFF_CUR at step 20 by accumulating detected or determined values for instantaneous vehicle speed VS, as may itself be derived, for example, from engine speed N and selected-transmission-gear information. Further, in the exemplary system 10, the controller 14 "clips" the detected or determined vehicle speed at a minimum velocity VS_MIN, for example, typically ranging from perhaps about 0.2 mph to about 0.3 mph (about 0.3 km/hr to about 0.5 km/hr), in order to include the corresponding "effective" distance traveled, for purposes of emissions, when the vehicle is traveling below that speed, or is at a stop. Most preferably, the minimum predetermined vehicle speed VS_MIN is characterized by a level of $NO_x$ emissions that is at least as great as the levels of $NO_x$ emissions generated by the engine 12 when idling at stoichiometry.

At step 222, the controller 14 determines a modified emissions measure NOX_CUR as the total emissions measure TP_NOX_TOT divided by the effective-distance-traveled measure DIST_EFF_CUR. As noted above, the modified emissions measure NOX_CUR is favorably expressed in units of "grams per mile."

Because certain characteristics of current vehicle activity impact vehicle emissions, for example, generating increased levels of exhaust gas constituents upon experiencing an increase in either the frequency and/or the magnitude of changes in engine output, the controller 14 determines a measure ACTIVITY representing a current level of vehicle activity (at step 224 of FIG. 2) and modifies a predetermined maximum emissions threshold NOX_MAX_STD (at step 226) based on the determined activity measure to thereby obtain a vehicle-activity-modified $NO_x$-per-mile threshold NOX_MAX which seeks to accommodate the impact of such vehicle activity.

While the vehicle activity measure ACTIVITY is determined at step 224 in any suitable manner based upon one or more measures of engine or vehicle output, including but not limited to a determined desired power, vehicle speed VS, engine speed N, engine torque, wheel torque, or wheel power, in the exemplary system 10, the controller 14 generates the vehicle activity measure ACTIVITY based upon a determination of instantaneous absolute engine power Pe, as follows:

$$Pe = TQ * N * k_I,$$

where TQ represents a detected or determined value for the engine's absolute torque output, N represents engine speed, and $k_I$ is a predetermined constant representing the system's moment of inertia. The controller 14 filters the determined values Pe over time, for example, using a high-pass filter $G_1(s)$, where s is the Laplace operator known to those skilled in the art, to produce a high-pass filtered engine power value HPe. After taking the absolute value AHPe of the high-pass-filtered engine power value HPe, the resulting absolute value AHPe is low-pass-filtered with filter $G_1(s)$ to obtain the desired vehicle activity measure ACTIVITY.

Similarly, while the current permissible emissions lend NOX_MAX is modified in any suitable manner to reflect current vehicle activity, in the exemplary system 10, at step 226, the controller 14 determines a current permissible emissions level NOX_MAX as a predetermined function $f_5$ of the predetermined maximum emissions threshold NOX_MAX_STD based on the determined vehicle activity measure ACTIVITY. By way of example only, in the exemplary system 10, the current permissible emissions level NOX_MAX typically varies between a minimum of about 20 percent of the predetermined maximum emissions threshold NOX_MAX_STD for relatively-high vehicle activity levels (e.g., for many transients) to a maximum of about seventy percent of the predetermined maximum emissions threshold NOX_MAX_STD (the latter value providing a "safety factor" ensuring that actual vehicle emissions do not exceed the proscribed government standard NOX_MAX_STD).

Referring again to FIG. 2, at step 228, the controller 14 determines whether the modified emissions measure NOX_CUR as determined in step 222 exceeds the maximum emissions level NOX_MAX as determined in step 226. If the modified emissions measure NOX_CUR does not exceed the current maximum emissions level NOX_MAX, the controller 14 remains free to select a lean engine operating condition in accordance with the exemplary system's lean-burn feature. If the modified emissions measure NOX_CUR exceeds the current maximum emissions level NOX_MAX, the controller 14 determines that the "fill" portion of a "complete" lean-burn fill/purge cycle has been completed, and the controller immediately initiates a purge event at step 230 by setting suitable purge event flags PRG_FLG and PRG_START_FLG to logical one.

If, at step 214 of FIG. 2, the controller 14 determines that a purge event has just been commenced, as by checking the current value for the purge-start flag PRG_START_FLG, the controller 14 resets the previously determined values TP_NOX_TOT and DIST_EFF_CUR for the total tailpipe $NO_x$ and the effective distance traveled and the determined modified emissions measure NOX_CUR, along with other stored values FG_NOX_TOT and FC_NOX_TOT_MOD (to be discussed below), to zero at step 232. The purg-estart flag PRG_START_FLG is similarly reset to logic zero at that time.

Figure 3A:
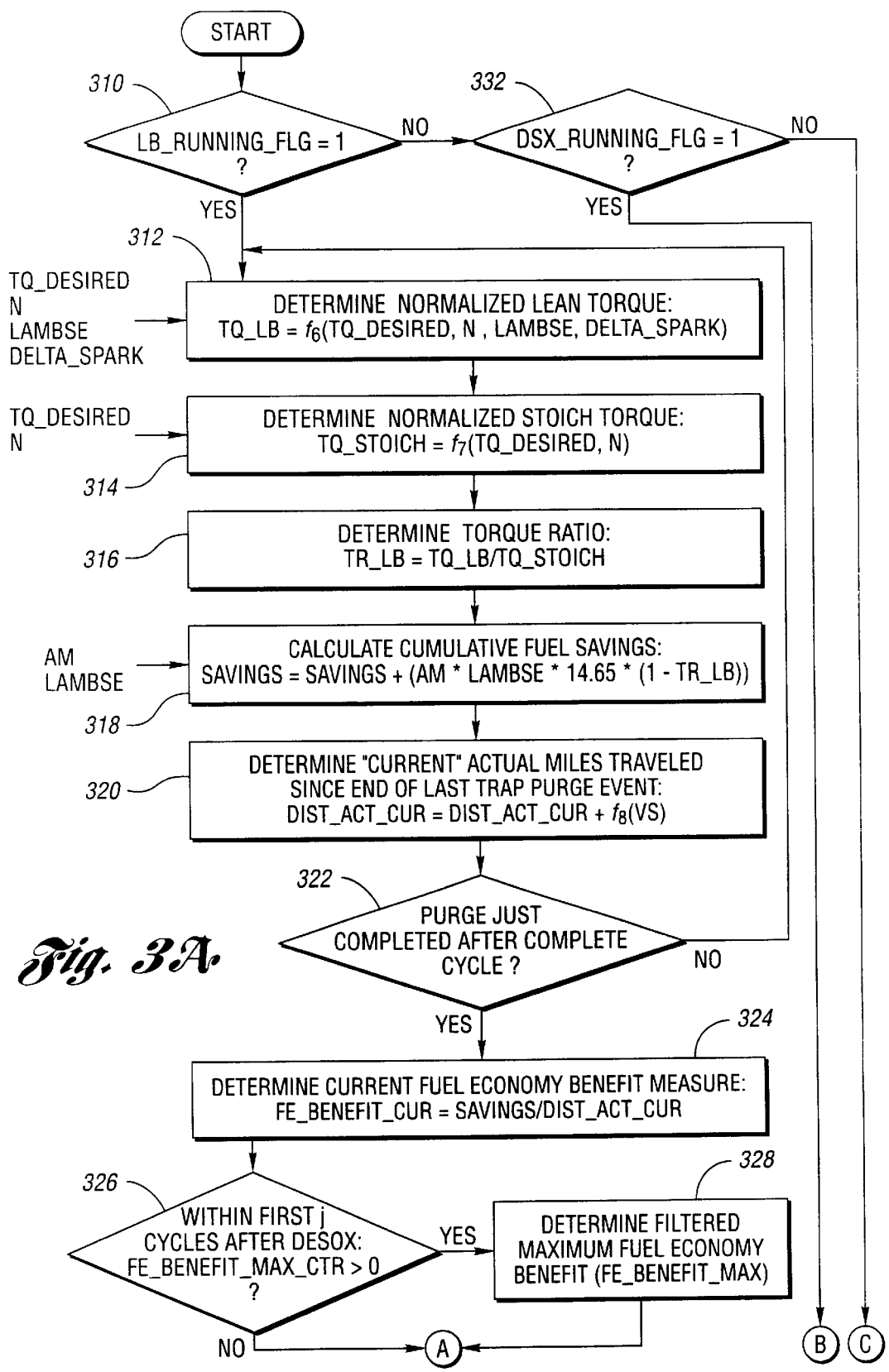
Figure 3B:
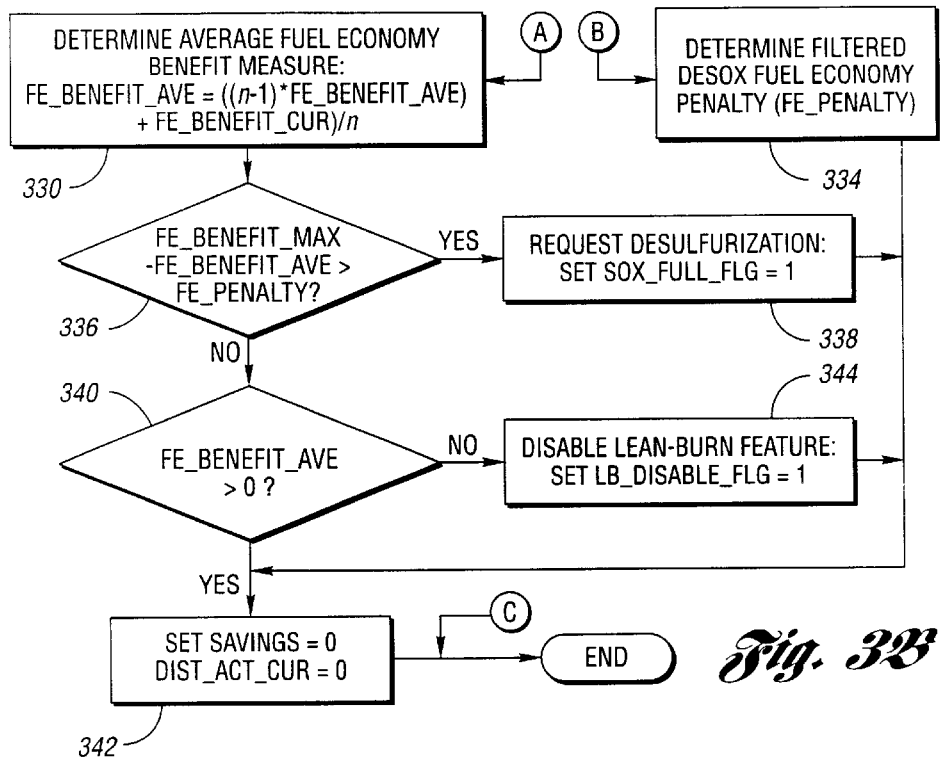
Figure 4:
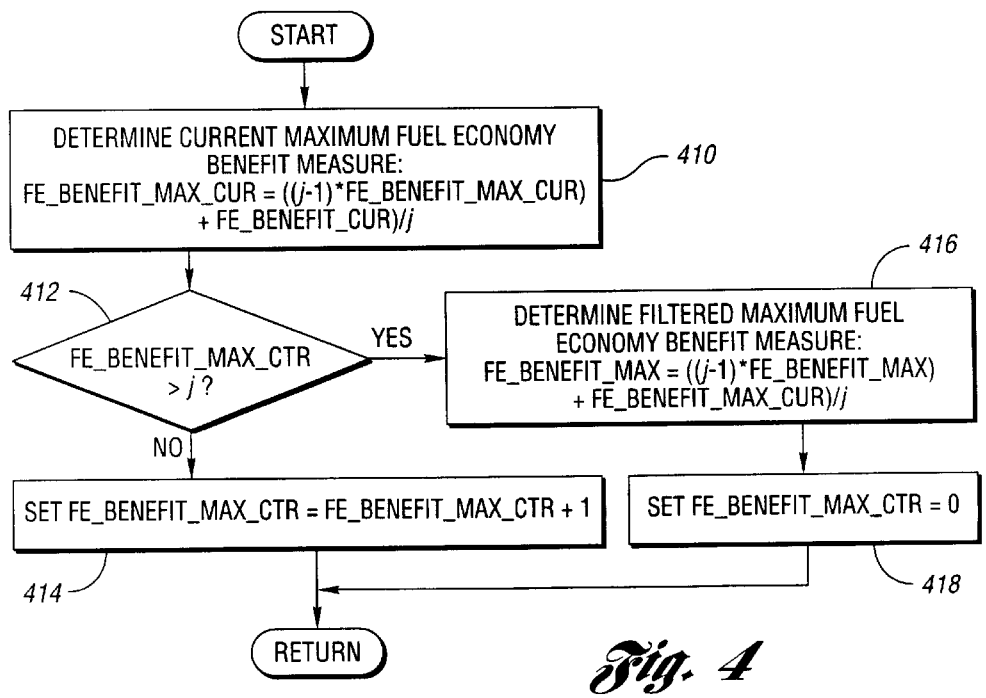
Figure 5:
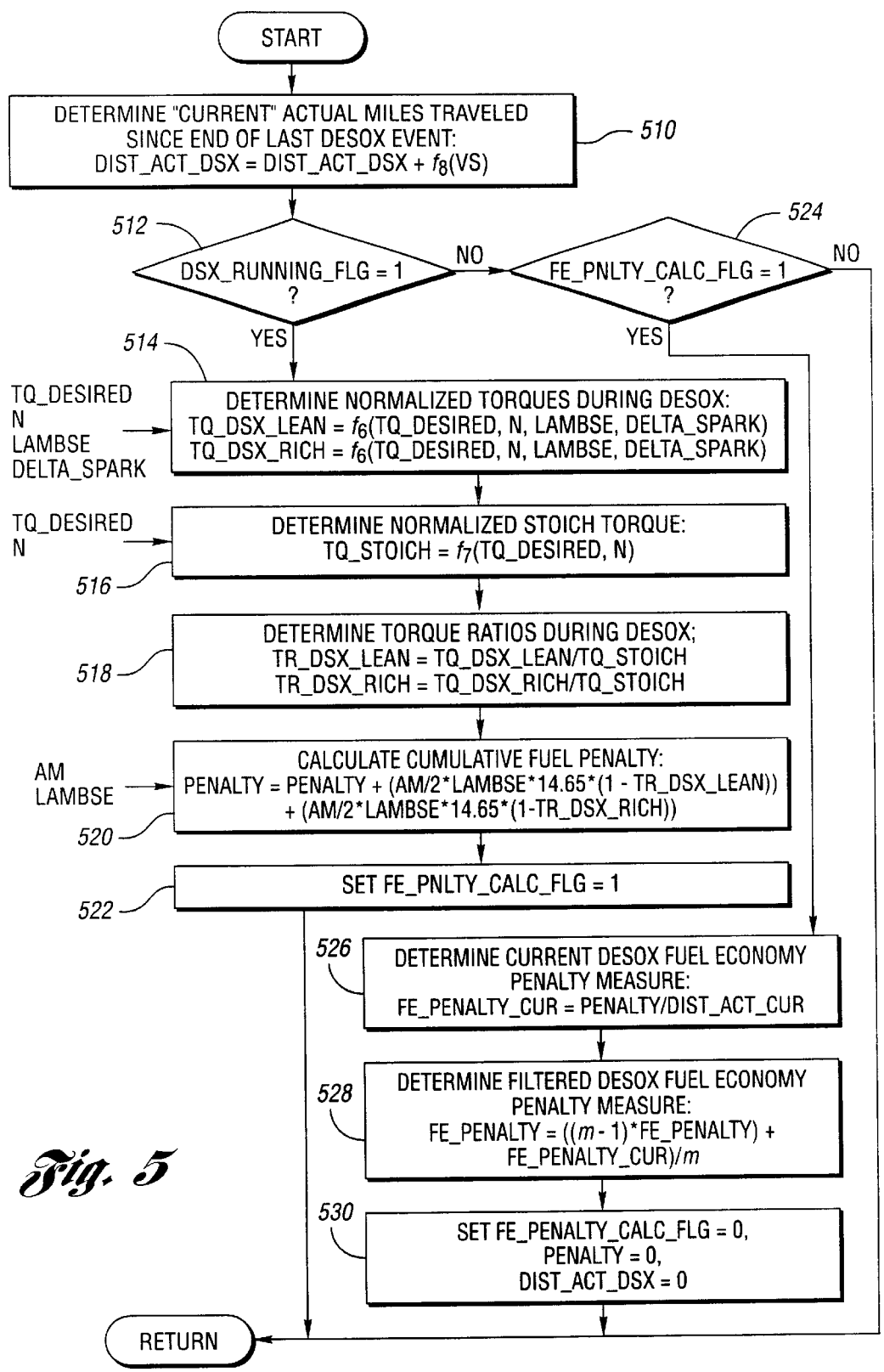

Refining generally to FIGS. 3–5, in the exemplary system 10, the controller 14 further conditions enablement of the lean-burn feature upon a determination of a positive performance impact or "benefit" of such lean-burn operation over a suitable reference operating condition, for example, a near-stoichiometric operating condition at MBT. By way of example only, the exemplary system 10 uses a fuel efficiency measure calculated for such lean-burn operation with reference to engine operation at the near-stoichiometric operating condition and, more specifically, a relative fuel efficiency or "fuel economy benefit" measure. Other suitable performance impacts for use with the exemplary system 10 include, without limitation, fuel usage, fuel savings per distance traveled by the vehicle, engine efficiency, overall vehicle tailpipe emissions, and vehicle drivability.

Indeed, the invention contemplates determination of a performance impact of operating the engine 12 and/or the vehicle's powertrain at any first operating mode relative to any second operating mode, and the difference between the first and second operating modes is not intended to be limited to the use of different air-fuel mixtures. Thus, the invention is intended to be advantageously used to determine or characterize an impact of any system or operating condition that affects generated torque, such as, for example, comparing stratified lean operation versus homogeneous lean operation, or determining an effect of exhaust gas recirculation (e.g., a fuel benefit can thus be associated with a given EGR setting), or determining the effect of various degrees of retard of a variable cam timing ("VCT") system, or characterizing the effect of operating charge motion control valves ("CMCV," an intake-charge swirl approach, for use with both stratified and homogeneous lean engine operation).

More specifically, the exemplary system 10, the controller 14 determines the performance impact of lean-burn operation relative to stoichiometric engine operation at MBT by calculating a torque ratio TR defined as the ratio, for a given speed-load condition, of a determined indicated torque output at a selected air-fuel ratio to a determined indicated torque output at stoichiometric operation, as described further below. In one embodiment, the controller 14 determines the torque ratio TR based upon stored values $TQ_{i,j,k}$ for engine torque, mapped as a function of engine speed N, engine load LOAD, and air-fuel ratio LAMBSE.

Alternatively, the invention contemplates use of absolute torque or acceleration information generated, for example, by a suitable torque meter or accelerometer (not shown), with which to directly evaluate the impact of, or to otherwise generate a measure representative of the impact of, the first operating mode relative to the second operating mode. While the invention contemplates use of any suitable torque meter or accelerometer to generate such absolute torque or acceleration information, suitable examples include a strain-gage torque meter positioned on the powertrain's output shaft to detect brake torque, and a high-pulse-frequency Hall-effect acceleration sensor positioned on the engine's crankshaft. As a further alternative, the invention contemplates use, in determining the impact of the first operating mode relative to the second operating mode, of the above-described determined measure Pe of absolute instantaneous engine power.

Where the difference between the two operating modes includes different fuel flow rates, as when comparing a lean or rich operating mode to a reference stoichiometric operating mode, the torque or power measure for each operating mode is preferably normalized by a detected or determined fuel flow rate. Similarly, if the difference between the two operating modes includes different or varying engine speed-load points, the torque or power measure is either corrected (for example, by taking into account the changed engine speed-load conditions) or normalized (for example, by relating the absolute outputs to fuel flow rate, e.g., as represented by fuel pulse width) because such measures are related to engine speed and system moment of inertia.

It will be appreciated that the resulting torque or power measures can advantageously be used as "on-line" measures of a performance impact. However, where there is a desire to improve signal quality, i.e., to reduce noise, absolute instantaneous power or normalized absolute instantaneous power can be integrated to obtain a relative measure of work performed in each operating mode. If the two modes are characterized by a change in engine speed-load points, then the relative work measure is corrected for thermal efficiency, values for which may be conveniently stored in a ROM look-up table.

Returning to the exemplary system 10 and the flow chart appearing as FIG. 3, wherein the performance impact is a determined percentage fuel economy benefit/loss associated with engine operation at a selected lean or rich "lean-burn" operating condition relative to a reference stoichiometric operating condition at MBT, the controller 14 first determines at step 310 whether the lean-burn feature is enabled. If the lean-burn feature is enabled as, for example indicated by the lean-burn running flag LB_RUNNING_FLG being equal to logical one, the controller 14 determines a first value TQ_LB at step 312 representing an indicated torque output for the engine when operating at the selected lean or rich operating condition, based on its selected air-fuel ratio LAMBSE and the degrees DELTA_SPARK of retard from MBT of its selected ignition timing, and further normalized for fuel flow. At step 314, the controller 14 determines a second value TQ_STOICH representing an indicated torque output for the engine 12 when operating with a stoichiometric air-fuel ratio at MBT, likewise normalized for fuel flow. At step 316, the controller 14 calculates the lean-burn torque ratio TR_LB by dividing the first normalized torque value TQ_LB with the second normalized torque value TQ_STOICH.

At step 318 of FIG. 3, the controller 14 determines a value SAVINGS representative of the cumulative fuel savings to be achieved by operating at the selected lean operating condition relative to the reference stoichiometric operating condition, based upon the air mass value AM, the current (lean or rich) lean-burn air-fuel ratio (LAMBSE) and the determined lean-burn torque ratio TR_LB, wherein

SAVINGS=SAVINGS+(AM*LAMBSE*14.65*(1−TR_LB)).

At step 320, the controller 14 determines a value DIST_ACT_CUR representative of the actual miles traveled by the vehicle since the start of the last trap purge or desulfurization event. While the "current" actual distance value DIST_ACT_CUR is determined in any suitable manner, in the exemplary system 10, the controller 14 determines the current actual distance value DIST_ACT_CUR by accumulating detected or determined instantaneous values VS for vehicle speed.

Because the fuel economy benefit to be obtained using the lean-burn feature is reduced by the "fuel penalty" of any associated trap purge event, in the exemplary system 10, the controller 14 determines the "current" value FE_BENEFIT_CUR for fuel economy benefit only once per "complete" lean-fill/rich-purge cycle, as determined at steps 228 and 230 of FIG. 2. And, because the purge event's fuel penalty is directly related to the preceding trap "fill," the current fuel economy benefit value FE_BENEFIT_CUR is preferably determined at the moment that the purge event is deemed to have just been completed. Thus, at step 322 of FIG. 3, the controller 14 determines whether a purge event has just been completed following a complete trap fill/purge cycle and, if so, determines at step 324 a value FE_BENEFIT_CUR representing current fuel economy benefit of lean-burn operation over the last complete fill/purge cycle.

At steps 326 and 328 of FIG. 3, current values FE_BENEFIT_CUR for fuel economy benefit are averaged over the first j complete fill/purge cycles immediately following a trap decontaminating event, such as a desulfurization event, in order to obtain a value FE_BENEFIT_MAX_CUR representing the "current" maximum fuel economy benefit which is likely to be achieved with lean-burn operation, given the then-current level of "permanent" trap sulfurization and aging. By way of example only, as illustrated in FIG. 4, maximum fuel economy benefit averaging is performed by the controller 14 using a conventional low-pass filter at step 410. In order to obtain a more robust value FE_BENEFIT_MAX for the maximum fuel economy benefit of lean-burn operation, in the exemplary system 10, the current value FE_BENEFIT_MAX_CUR is likewise filtered over j desulfurization events at steps 412, 414, 416 and 418.

Returning to FIG. 3, at step 330, the controller 14 similarly averages the current values FE_BENFIT_CUR for fuel economy benefit over the last n trap fill/purge cycles to obtain an average value FE_BENEFIT_AVE representing the average fuel economy benefit being achieved by such lean-burn operation and, hence, likely to be achieved with further lean-burn operation. By way of example only, in the exemplary system 10, the average fuel economy benefit value FE_BENEFIT_AVE is calculated by the controller 14 at step 330 as a rolling average to thereby provide a relatively noise-insensitive "on-line" measure of the fuel economy performance impact provided by such lean engine operation.

Because continued lean-burn operation periodically requires a desulfurization event, when a desulfurization event is identified as being in-progress at step 332 of FIG. 3, the controller 14 determines a value FE_PENALTY at step 334 representing the fuel economy penalty associated with desulfurization. While the fuel economy penalty value FE_PENALTY is determined in any suitable manner, an exemplary method for determining the fuel economy penalty value FE_PENALTY is illustrated in FIG. 5. Specifically, in step 510, the controller 14 updates a stored value DIST_ACT_DSX representing the actual distance that the vehicle has traveled since the termination or "end" of the immediately-preceding desulfurization event. Then, at step 512, the controller 14 determines whether the desulfurization event running flag DSX_RUNNING_FLG is equal to logical one, thereby indicating that a desulfurization event is in process. While any suitable method is used for desulfurizing the trap 36, in the exemplary system 10, the desulfurization event is characterized by operation of some of the engine's cylinders with a lean air-fuel mixture and other of the engine's cylinders 18 with a rich air-fuel mixture, thereby generating exhaust gas with a slightly-rich bias. At the step 514, the controller 14 then determines the corresponding fuel-normalized torque values TQ_DSX_LEAN and TQ_DSX_RICH, as described above in connection with FIG. 3. At step 516, the controller 14 further determines the corresponding fuel-normalized stoichiometric torque value TQ_STOICH and, at step 518, the corresponding torque ratios TR_DSX_LEAN and TR_DSX_RICH.

The controller 14 then calculates a cumulative fuel economy penalty value, as follows:

PENALTY=PENALTY+(AM/2*LAMBSE*14.65*(1−TR_DSX_LEAN))+(AM/2*LAMBSE*14.65*(1−TR_DSX_RICH))

Then, at step 522, the controller 14 sets a fuel economy penalty calculation flag FE_PNLTY_CALC_FLG equal to logical one to thereby ensure that the current desulfurization fuel economy penalty measure FE_PENALTY_CUR is determined immediately upon termination of the on-going desulfurization event.

If the controller 14 determines, at steps 512 and 524 of FIG. 5, that a desulfurization event has just been terminated, the controller 14 then determines the current value FE_PENALTY_CUR for the fuel economy penalty associated with the terminated desulfurization event at step 526, calculated as the cumulative fuel economy penalty value PENALTY divided by the actual distance value DIST_ACT_DSX. In this way, the fuel economy penalty associated with a desulfurization event is spread over the actual distance that the vehicle has traveled since the immediately-prior desulfurization event.

At step 528 of FIG. 5, the controller 14 calculates a rolling average value FE_PENALTY of the last m current fuel economy penalty values FE_PENALTY_CUR to thereby provide a relatively-noise-insensitive measure of the fuel economy performance impact of such desulfurization events. By way of example only, the average negative performance impact or "penalty" of desulfurization typically ranges between about 0.3 percent to about 0.5 percent of the performance gain achieved through lean-burn operation. At step 530, the controller 14 resets the fuel economy penalty calculation flag FE_PNLTY_CALC_FLG to zero, along with the previously determined (and summed) actual distance value DIST_ACT_DSX and the current fuel economy penalty value PENALTY, in anticipation for the next desulfurization event.

Returning to FIG. 3, the controller 14 requests a desulfurization event only if and when such an event is likely to generate a fuel economy benefit in ensuing lean-burn operation. More specifically, at step 332, the controller 14 determines whether the difference by which between the maximum potential fuel economy benefit FE_BENEFIT_MAX exceeds the current fuel economy benefit FE_BENEFIT_CUR is itself greater than the average fuel economy penalty FE_PENALTY associated with desulfurization. If so, the controller 14 requests a desulfurization event by setting a suitable flag SOX_FULL_FLG to logical one. Thus, it will be seen that the exemplary system 10 advantageously operates to schedule a desulfurization event whenever such an event would produce improved fuel economy benefit, rather than deferring any such decontamination event until contaminant levels within the trap 36 rise above a predetermined level.

In the event that the controller 14 determines at step 332 that the difference between the maximum fuel economy benefit value FE_BENEFIT_MAX and the average fuel economy value FE_BENEFIT_AVE is not greater than the fuel economy penalty FE_PENALTY associated with a decontamination event, the controller 14 proceeds to step 336 of FIG. 3, wherein the controller 14 determines whether the average fuel economy benefit value FE_BENEFIT_AVE is greater than zero. If the average fuel economy benefit value is less than zero, and with the penalty associated with any needed desulfurization event already having been determined at step 332 as being greater than the likely improvement to be derived from such desulfurization, the controller 14 disables the lean-burn feature at step 340 of FIG. 3. The controller 14 then resets the fuel savings value SAVINGS and the current actual distance measure DIST_ACT_CUR to zero at step 338.

Figure 6:
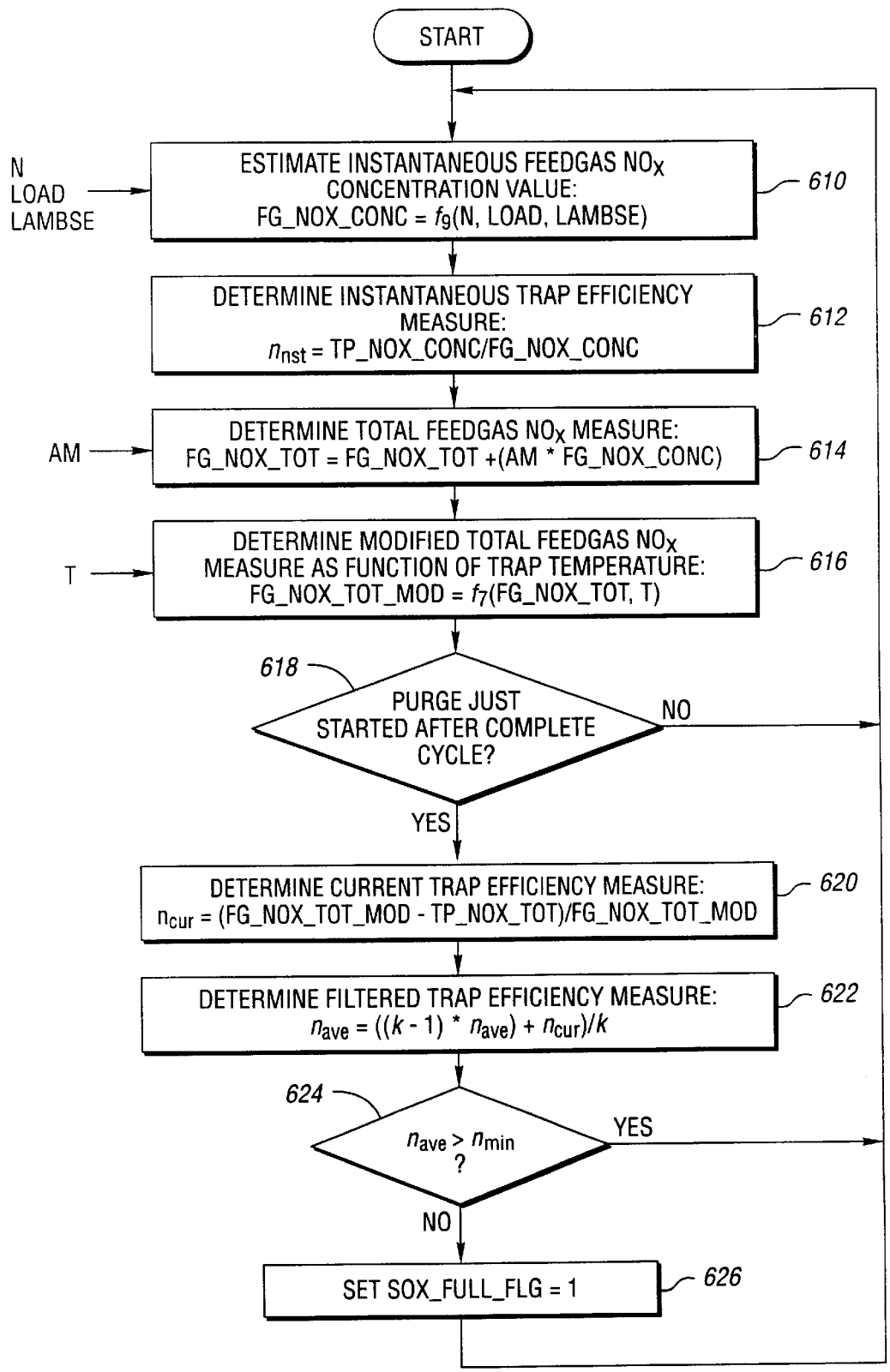

Alternatively, the controller 14 schedules a desulfurization event during lean-burn operation when the trap's average efficiency $\eta_{ave}$ is deemed to have fallen below a predetermined minimum efficiency $\eta_{min}$. While the average trap efficiency $\eta_{ave}$ is determined in any suitable manner, as seen in FIG. 6, the controller 14 periodically estimates the current efficiency $\eta_{cur}$ of the trap 36 during a lean engine operating condition which immediately follows a purge event. Specifically, at step 610, the controller 14 estimates a value FG_NOX_CONC representing the $NO_x$ concentration in the exhaust gas entering the trap 36, for example, using stored values for engine feedgas $NO_x$ that are mapped as a function of engine speed N and load LOAD for "dry" feedgas and, preferably, modified for average trap temperature T (as by multiplying the stored values by the temperature-based output of a modifier lookup table, not shown). Preferably, the feedgas $NO_x$ concentration value FG_NOX_CONC is further modified to reflect the $NO_x$-reducing activity of the three-way catalyst 34 upstream of the trap 36, and other factors influencing $NO_x$ storage, such as trap temperature T, instantaneous trap efficiency $\eta_{inst}$, and estimated trap sulfation levels.

At step 612, the controller 14 calculates an instantaneous trap efficiency value $\eta_{inst}$ as the feedgas $NO_x$ concentration value FG_NOX_CONC divided by the tailpipe $NO_x$ concentration value TP_NOX_CONC (previously determined at step 216 of FIG. 2). At step 614, the controller 14 accumulates the product of the feedgas $NO_x$ concentration values FG_NOX_CONC times the current air mass values AM to obtain a measure FG_NOX_TOT representing the total amount of feedgas $NO_x$ reaching the trap 36 since the start of the immediately-preceding purge event. At step 616, the controller 14 determines a modified total feedgas $NO_x$ measure FG_NOX_TOT_MOD by modifying the current value FG_NOX_TOT as a function of trap temperature T. After determining at step 618 that a purge event has just begun following a complete fill/purge cycle, at step 620, the controller 14 determines the current trap efficiency measure $\eta_{cur}$ as difference between the modified total feedgas $NO_x$ measure FG_NOX_TOT_MOD and the total tailpipe $NO_x$ measure TP_NOX_TOT (determined at step 218 of FIG. 2), divided by the modified total feedgas $NO_x$ measure FG_NOX_TOT_MOD.

At step 622, the controller 14 filters the current trap efficiency measure measure $\eta_{cur}$, for example, by calculating the average trap efficiency measure $\eta_{ave}$ as a rolling average of the last k values for the current trap efficiency measure $\eta_{cur}$. At step 624, the controller 14 determines whether the average trap efficiency measure $\eta_{nave}$ has fallen below a minimum average efficiency threshold $\eta_{min}$. If the average trap efficiency measure $\eta_{ave}$ has indeed fallen below the minimum average efficiency threshold $\eta_{min}$, the controller 14 sets both the desulfurization request flag SOX_FULL_FLG to logical one, at step 626 of FIG. 6.

To the extent that the trap 36 must be purged of stored $NO_x$ to rejuvenate the trap 36 and thereby permit further lean-burn operation as circumstances warrant, the controller 14 schedules a purge event when the modified emissions measure NOX_CUR, as determined in step 222 of FIG. 2, exceeds the maximum emissions level NOX_MAX, as determined in step 226 of FIG. 2. Upon the scheduling of such a purge event, the controller 14 determines a suitable rich air-fuel ratio as a function of current engine operating conditions, e.g., sensed values for air mass flow rate. By way of example, in the exemplary embodiment, the determined rich air-fuel ratio for purging the trap 36 of stored $NO_x$ typically ranges from about 0.65 for "low-speed" operating conditions to perhaps 0.75 or more for "high-speed" operating conditions. The controller 14 maintains the determined air-fuel ratio until a predetermined amount of CO and/or HC has "broken through" the trap 36, as indicated by the product of the first output signal SIGNAL1 generated by the $NO_x$ sensor 40 and the output signal AM generated by the mass air flow sensor 24.

Figure 7:
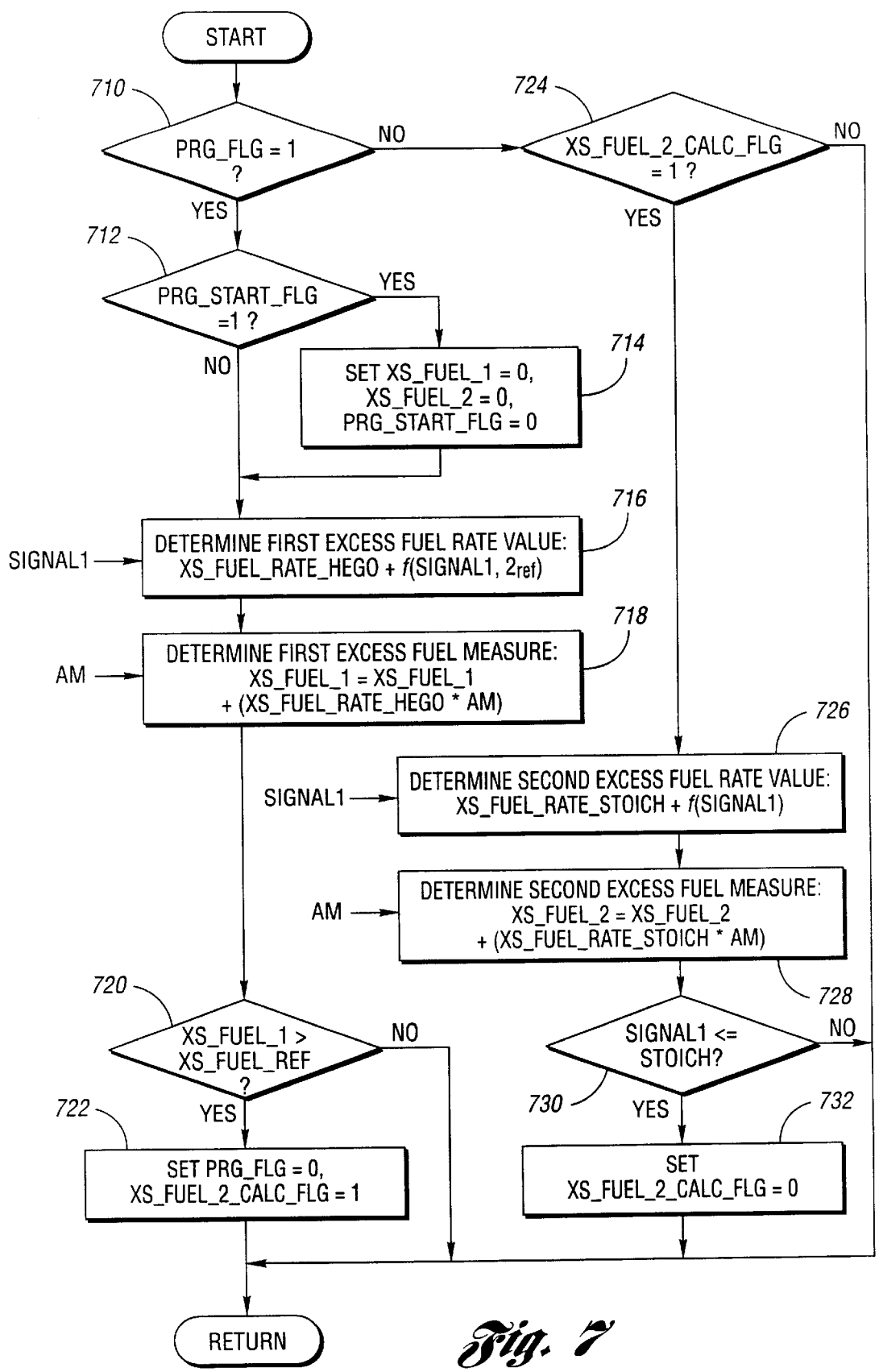

More specifically, as illustrated in the flow chart appearing as FIG. 7 and the plots illustrated in FIGS. 8A, 8B and 9, during the purge event, after determining at step 710 that a purge event has been initiated, the controller 14 determines at step 712 whether the purge event has just begun by checking the status of the purge-start flag PRG_START_FLG. If the purge event has, in fact, just begun, the controller resets certain registers (to be discussed individually below) to zero. The controller 14 then determines a first excess fuel rate value XS_FUEL_RATE_HEGO at step 716, by which the first output signal SIGNAL1 is "rich" of a first predetermined, slightly-rich threshold $\lambda_{ref}$ (the first threshold $\lambda_{ref}$ being exceeded shortly after a similarly-positioned HEGO sensor would have "switched"). The controller 14 then determines a first excess fuel measure XS_FUEL_1 as by summing the product of the first excess fuel rate value XS_FUEL_RATE_HEGO and the current output signal AM generated by the mass air flow sensor 24 (at step 718). The resulting first excess fuel measure XS_FUEL_1, which represents the amount of excess fuel exiting the tailpipe 42 near the end of the purge event, is graphically illustrated as the cross-hatched area REGION I in FIG. 9. When the controller 14 determines at step 720 that the first excess fuel measure XS_FUEL_1 exceeds a predetermined excess fuel threshold XS_FUEL_REF, the trap 36 is deemed to have been substantially "purged" of stored $NO_x$, and the controller 14 discontinues the rich (purging) operating condition at step 722 by resetting the purge flag PRG_FLG to logical zero. The controller 14 further initializes a post-purge-event excess fuel determination by setting a suitable flag XS_FUEL_2_CALC to logical one.

Returning to steps 710 and 724 of FIG. 7, when the controller 14 determines that the purge flag PRG_FLG is not equal to logical one and, further, that the post-purge-event excess fuel determination flag XS_FUEL_2_CALC is set to logical one, the controller 14 begins to determine the amount of additional excess fuel already delivered to (and still remaining in) the exhaust system 32 upstream of the trap 36 as of the time that the purge event is discontinued. Specifically, at step 726, the controller 14 starts determining a second excess fuel measure XS_FUEL_2 by summing the product of the difference XS_FUEL_RATE_STOICH by which the first output signal SIGNAL1 is rich of stoichiometry, and summing the product of the difference XS_FUEL_RATE_STOICH and the mass air flow rate AM. The controller 14 continues to sum the difference XS_FUEL_RATE_STOICH until the first output signal SIGNAL1 from the $NO_x$ sensor 40 indicates a stoichiometric value, at step 730 of FIG. 7, at which point the controller 14 resets the post-purge-event excess fuel determination flag XS_FUEL_2_CALC to logical zero. The resulting second excess fuel measure value XS_FUEL_2, representing the amount of excess fuel exiting the tailpipe 42 after the purge event is discontinued, is graphically illustrated as the cross-hatched area REGION II in FIG. 9. Preferably, the second excess fuel value XS_FUEL_2 in the KAM as a function of engine speed and load, for subsequent use by the controller 14 in optimizing the purge event.

The exemplary system 10 also periodically determines a measure NOX_CAP representing the nominal $NO_x$-storage capacity of the trap 36. In accordance with a first method, graphically illustrated in FIG. 10, the controller 14 compares the instantaneous trap efficiency $\eta_{inst}$, as determined at step 612 of FIG. 6, to the predetermined reference efficiency value $\eta_{ref}$. While any appropriate reference efficiency value $\eta_{ref}$ is used, in the exemplary system 10, the reference efficiency value $\eta_{ref}$ is set to a value significantly greater than the minimum efficiency threshold $\eta_{min}$. By way of example only, in the exemplary system 10, the reference efficiency value $\eta_{ref}$ is set to a value of about 0.65.

Figure 10:
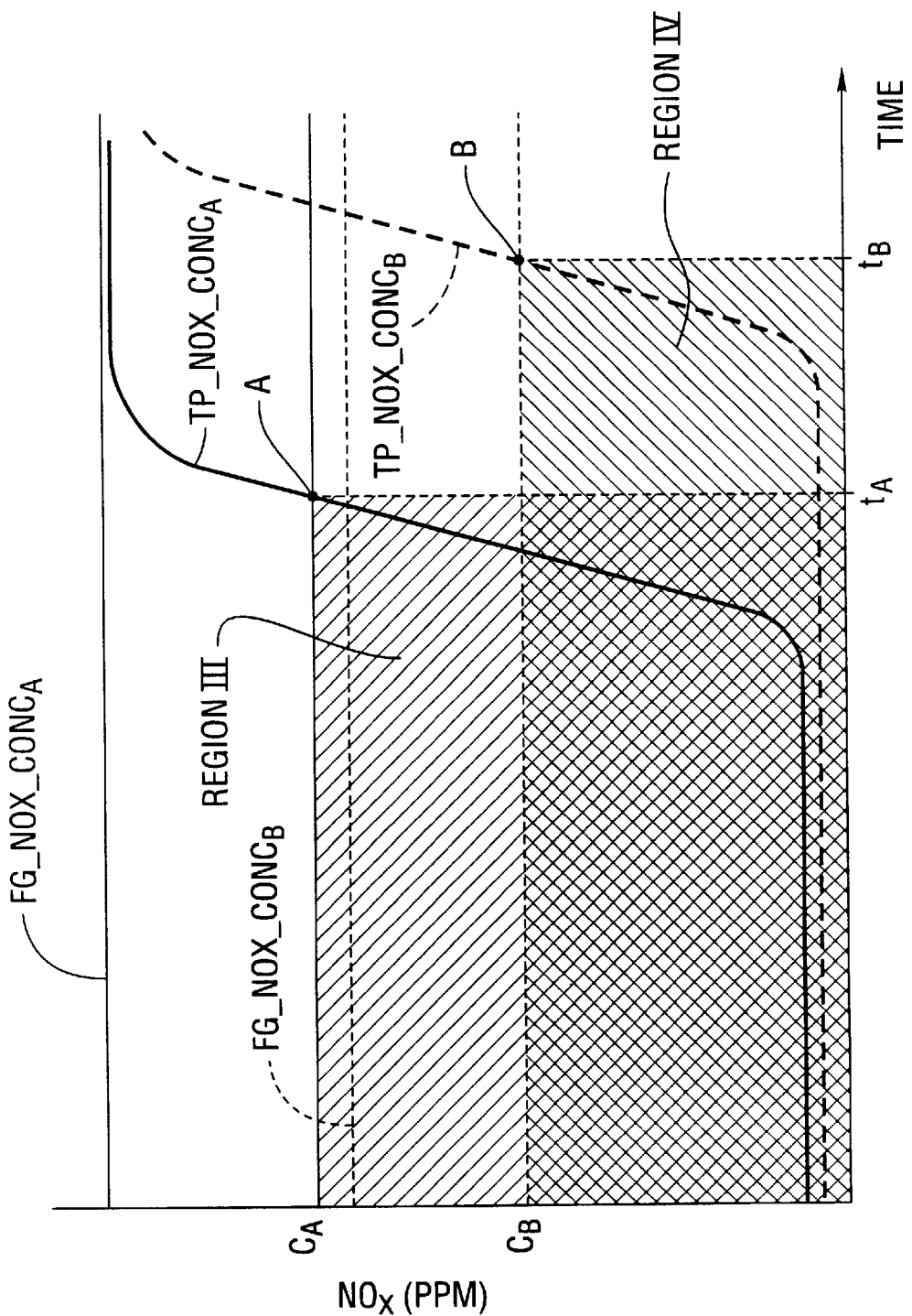
FIG. 10 is a plot illustrating feedgas and tailpipe $NO_x$ rates during a trap-filling lean engine operating condition, for both dry and high-relative-humidity conditions.

When the controller 14 first determines that the instantaneous trap efficiency $\eta_{inst}$ has fallen below the reference efficiency value $\eta_{ref}$, the controller 14 immediately initiates a purge event, even though the current value for the modified tailpipe emissions measure NOX_CUR, as determined in step 222 of FIG. 2, likely has not yet exceeded the maximum emissions level NOX_MAX. Significantly, as seen in FIG. 10, because the instantaneous efficiency measure $\eta_{inst}$ inherently reflects the impact of humidity on feedgas $NO_x$ generation, the exemplary system 10 automatically adjusts the capacity-determining "short-fill" times $t_A$ and $t_B$ at which respective dry and relatively-high-humidity engine operation exceed their respective "trigger" concentrations $C_A$ and $C_B$. The controller 14 then determines the first excess (purging) fuel value XS_FUEL_1 using the closed-loop purge event optimizing process described above.

Figure 11:
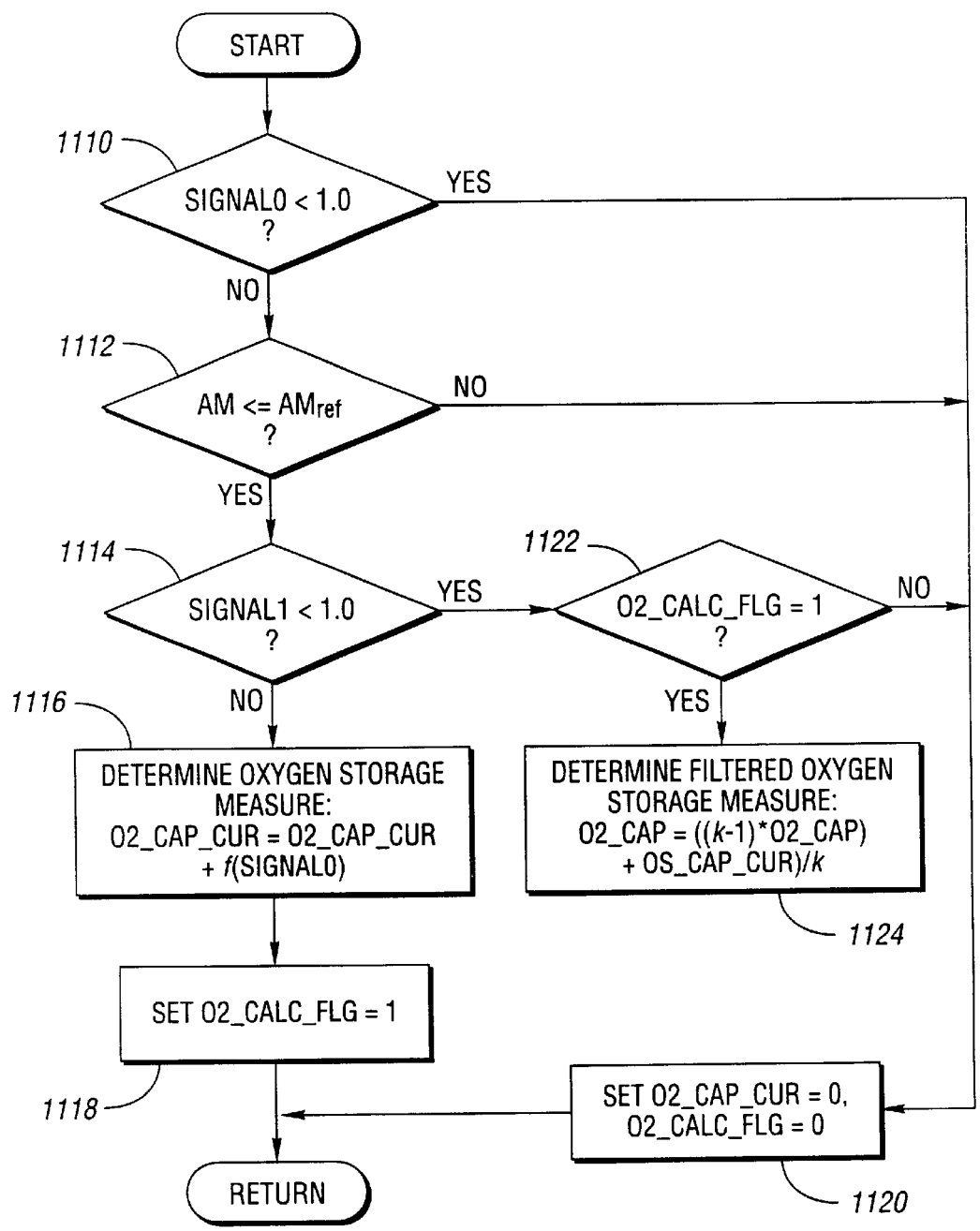
FIG. 11 is a flow chart depicting an exemplary method for determining the nominal oxygen storage capacity of the trap.

Because the purge event effects a release of both stored $NO_x$ and stored oxygen from the trap 36, the controller 14 determines a current $NO_x$-storage capacity measure NOX_CAP_CUR as the difference between the determined first excess (purging) fuel value XS_FUEL_1 and a filtered measure O2_CAP representing the nominal oxygen storage capacity of the trap 36. While the oxygen storage capacity measure O2_CAP is determined by the controller 14 in any suitable manner, in the exemplary system 10, the oxygen storage capacity measure O2_CAP is determined by the controller 14 immediately after a complete-cycle purge event, as illustrated in FIG. 11.

Specifically, during lean-burn operation immediately following a complete-cycle purge event, the controller 14 determines at step 1110 whether the air-fuel ratio of the exhaust gas air-fuel mixture upstream of the trap 36, as indicated by the output signal SIGNAL0 generated by the upstream oxygen sensor 38, is lean of stoichiometry. The controller 14 thereafter confirms, at step 1112, that the air mass value AM, representing the current air charge being inducted into the cylinders 18, is less than a reference value AMref, thereby indicating a relatively-low space velocity under which certain time delays or lags due, for example, to the exhaust system piping fuel system are de-emphasized. The reference air mass value $AM_{ref}$ is preferably selected as a relative percentage of the maximum air mass value for the engine 12, itself typically expressed in terms of maximum air charge at STP. In the exemplary system 10, the reference air mass value $AM_{ref}$ is no greater than about twenty percent of the maximum air charge at STP and, most preferably, is no greater than about fifteen percent of the maximum air charge at STP.

If the controller 14 determines that the current air mass value is no greater than the reference air mass value $AM_{ref}$, at step 1114, the controller 14 determines whether the downstream exhaust gas is still at stoichiometry, using the first output signal SIGNAL1 generated by the $NO_x$ sensor 40. If so, the trap 36 is still storing oxygen, and the controller 14 accumulates a measure O2_CAP_CUR representing the current oxygen storage capacity of the trap 36 using either the oxygen content signal SIGNAL0 generated by the upstream oxygen sensor 38, as illustrated in step 1116 of FIG. 11, or, alternatively, from the injector pulse-width, which provides a measure of the fuel injected into each cylinder 18, in combination with the current air mass value AM. At step 1118, the controller 14 sets a suitable flag O2_CALC_FLG to logical one to indicate that an oxygen storage determination is on-going.

The current oxygen storage capacity measure O2_CAP_CUR is accumulated until the downstream oxygen content signal SIGNAL1 from the $NO_x$ sensor 40 goes lean of stoichiometry, thereby indicating that the trap 36 has effectively been saturated with oxygen. To the extent that either the upstream oxygen content goes to stoichiometry or rich-of-stoichiometry (as determined at step 1110), or the current air mass value AM rises above the reference air mass value $AM_{ref}$ (as determined at step 1112), before the downstream exhaust gas "goes lean" (as determined at step 1114), the accumulated measure O2_CAP_CUR and the determination flag O2_CALC_FLG are each reset to zero at step 1120. In this manner, only uninterrupted, relatively-low-space-velocity "oxygen fills" are included in any filtered value for the trap's oxygen storage capacity.

To the extent that the controller 14 determines, at steps 1114 and 1122, that the downstream oxygen content has "gone lean" following a suitable relatively-low-space-velocity oxygen fill, i.e., with the capacity determination flag O2_CALC_FLG equal to logical one, at step 1124, the controller 14 determines the filtered oxygen storage measure O2_CAP using, for example, a rolling average of the last k current values O2_CAP_CUR.

Returning to FIG. 10, because the purge event is triggered as a function of the instantaneous trap efficiency measure $\eta_{inst}$, and because the resulting current capacity measure NOX_CAP_CUR is directly related to the amount of purge fuel needed to release the stored $NO_x$ from the trap 36 (illustrated as REGIONS III and IV on FIG. 10 corresponding to dry and high-humidity conditions, respectively, less the amount of purge fuel attributed to release of stored oxygen), a relatively repeatable measure NOX_CAP_CUR is obtained which is likewise relatively immune to changes in ambient humidity. The controller 14 then calculates the nominal $NO_x$-storage capacity measure NOX_CAP based upon the last m values for the current capacity measure NOX_CAP_CUR, for example, calculated as a rolling average value.

Alternatively, the controller 14 determines the current trap capacity measure NOX_CAP_CUR based on the difference between accumulated measures representing feedgas and tailpipe $NO_x$ at the point in time when the instantaneous trap efficiency $\eta_{inst}$ first falls below the reference efficiency threshold $\eta_{ref}$. Specifically, at the moment the instantaneous trap efficiency $\eta_{inst}$ first falls below the reference efficiency threshold $\eta_{ref}$, the controller 14 determines the current trap capacity measure NOX_CAP_CUR as the difference between the modified total feedgas $NO_x$ measure FG_NOX_TOT_MOD (determined at step 616 of FIG. 6) and the total tailpipe $NO_x$ measure TP_NOX_TOT (determined at step 218 of FIG. 2). Significantly, because the reference efficiency threshold $\eta_{ref}$ is preferably significantly greater than the minimum efficiency threshold $\eta_{min}$, the controller 14 advantageously need not immediately disable or discontinue lean engine operation when determining the current trap capacity measure NOX_CAP_CUR using the alternative method. It will also be appreciated that the oxygen storage capacity measure O2_CAP, standing alone, is useful in characterizing the overall performance or "ability" of the $NO_x$ trap to reduce vehicle emissions.

The controller 14 advantageously evaluates the likely continued vehicle emissions performance during lean engine operation as a function of one of the trap efficiency measures $\eta_{inst}$, $\eta_{cur}$ or $\eta_{ave}$, and the vehicle activity measure ACTIVITY. Specifically, if the controller 14 determines that the vehicle's overall emissions performance would be substantively improved by immediately purging the trap 36 of stored $NO_x$, the controller 14 discontinues lean operation and initiates a purge event. In this manner, the controller 14 operates to discontinue a lean engine operating condition, and initiates a purge event, before the modified emissions measure NOX_CUR exceeds the modified emissions threshold NOX_MAX. Similarly, to the extent that the controller 14 has disabled lean engine operation due, for example, to a low trap operating temperature, the controller 14 will delay the scheduling of any purge event until such time as the controller 14 has determined that lean engine operation may be beneficially resumed.

Significantly, because the controller 14 conditions lean engine operation on a positive performance impact and emissions compliance, rather than merely as a function of $NO_x$ stored in the trap 36, the exemplary system 10 is able to advantageously secure significant fuel economy gains from such lean engine operation without compromising vehicle emissions standards.

While an exemplary system and associated methods have been illustrated and described, it should be appreciated that the invention is susceptible of modification without departing from the spirit of the invention or the scope of the subjoined claims.

What is claimed is:

1. A method for accessing the ability of an emissions control device to releasably store a quantity of a constituent of exhaust gas generated by lean-burn operation of an internal combustion engine, wherein the device stores the quantity of the exhaust gas constituent when the exhaust gas directed through the device is lean of stoichiometry and the device releases a previously-stored amount of the exhaust gas constituent when the exhaust gas directed through the device is rich of stoichiometry, the method comprising:
    determining that the engine is operating at a first lean operating condition immediately following a first rich engine operating condition, the first rich engine operating condition having been sufficient to release substantially all of the previously-stored amount of the exhaust gas constituent from the device, the first lean operating condition operating to store an additional amount of the exhaust gas constituent in the device;
    determining, during the first lean operating condition, a first measure representative of the instantaneous efficiency of the device to remove the exhaust gas constituent from the exhaust gas;
    initiating a second rich operating condition when the first measure falls below a reference value, the second rich operating condition being characterized by the combustion of a quantity of fuel in excess of a stoichiometric quantity of fuel sufficient to release substantially all of the additional amount of the exhaust gas constituent from the device; and
    determining an ability of the device based on the quantity of excess fuel.

2. The method of claim 1, wherein determining the first measure includes:
    determining a second value representative of the content of the exhaust gas constituent in exhaust gas entering the device;
    determining a third value representative of the content of the exhaust gas constituent in exhaust gas exiting the device; and
    calculating the first measure based on the second and third values.

3. The method of claim 2, wherein determining the second measure includes estimating the content of the exhaust gas constituent in the exhaust gas based upon at least one of the group consisting of engine speed and engine load.

4. The method of claim 2, wherein determining the third measure includes detecting the content of the exhaust gas constituent in the exhaust gas with a sensor.

5. The method of claim 1, wherein the reference value is significantly greater than a minimum value necessary to maintain the content of the exhaust gas constituent in the exhaust gas exiting the trap below a predetermined threshold level.

6. The method of claim 5, wherein the reference value represents an efficiency of no less than about sixty-five percent.

7. A method for controlling the operation of an internal combustion engine in a motor vehicle, wherein the engine generates exhaust gas including an exhaust gas constituent, and wherein exhaust gas is directed through an emissions control device before being exhausted to the atmosphere, the device storing a quantity of the exhaust gas constituent when the exhaust gas directed through the device is lean of stoichiometry and releasing a previously-stored amount of the exhaust gas constituent when the exhaust gas directed through the device is rich of stoichiometry, the method comprising:

operating the engine in a first lean engine operating condition immediately following a first rich engine operating condition, the first rich engine operating condition being characterized by the release of substantially all of the previously-stored amount of the exhaust gas constituent from the device, the first lean operating condition operating to store an additional amount of the exhaust gas constituent in the device;

determining a first measure representative of the instantaneous efficiency of the device to remove the exhaust gas constituent from the exhaust gas;

discontinuing the first lean engine operating condition in favor of a second rich operating condition when the first measure falls below a reference value; and determining, during the second rich operating condition, a quantity of fuel in excess of a stoichiometric quantity of fuel sufficient to release substantially all of the additional amount of the exhaust gas constituent from the device.

8. The method of claim 7, wherein determining the first measure includes:

determining a second value representative of the content of the exhaust gas constituent in exhaust gas entering the device;

determining a third value representative of the content of the exhaust gas constituent in exhaust gas exiting the device; and calculating the first measure based on the second and third values.

9. The method of claim 8, wherein determining the second measure includes estimating the content of the exhaust gas constituent in the exhaust gas based upon at least one of the group consisting of engine speed and engine load.

10. The method of claim 8, wherein determining the third measure includes detecting the content of the exhaust gas constituent in the exhaust gas with a sensor.

11. The method of claim 7, wherein the reference value is significantly greater than a minimum value necessary to maintain the content of the exhaust gas constituent in the exhaust gas exiting the trap below a predetermined threshold level.

12. The method of claim 11, wherein the reference value represents an efficiency of no less than about sixty-five percent.

13. A controller for controlling an engine operating in combination with an emissions control device that releases a previously-stored first exhaust gas constituent when the engine is operated at a rich operating condition for a predetermined duration, wherein the controller is arranged to determine that the engine is operating at a first lean operating condition immediately following a rich engine operating condition, the rich engine operating condition having been sufficient to release substantially all of the previously-stored amount of the exhaust gas constituent from the device, the first lean operating condition operating to store an additional amount of the exhaust gas constituent in the device;

the controller being further arranged to determine a first measure representative of the instantaneous efficiency of the device to remove the exhaust gas constituent from the exhaust gas, and a second measure representative of the content of the exhaust gas constituent in exhaust gas exiting the device, to discontinue the first lean operating condition when the first measure falls below a reference value and the second measure is below a predetermined maximum threshold level, to initiate a subsequent rich operating condition characterized by the combustion of a quantity of fuel in excess of a stoichiometric quantity of fuel sufficient to release substantially all of the additional amount of the exhaust gas constituent from the device, and to determine an ability of the device based on the quantity of excess fuel.

14. The controller of claim 13, wherein the controller is further arranged to determine a third measure representative of the content of the exhaust gas constituent in exhaust gas entering the device, and to calculate the first measure based on the second and third measures.

15. The controller of claim 14, wherein the controller is further arranged to estimate at least one of the group consisting of the second and third measure based upon at least one of the group consisting of engine speed and engine load.

16. The controller of claim 14, wherein the controller is further arranged to determine at least one of the group consisting of the second and third measure based upon a signal generated by a sensor.

17. A controller for controlling an engine operating in combination with an emissions control device that releases a previously-stored first exhaust gas constituent when the engine is operated at a rich operating condition for a predetermined duration, wherein the controller is arranged to determine that the engine is operating at a lean operating condition immediately following a rich engine operating condition, the rich engine operating condition having been sufficient to release substantially all of the previously-stored amount of the exhaust gas constituent from the device, the first lean operating condition operating to store an additional amount of the exhaust gas constituent in the device;

the controller being further arranged to determine a first measure representative of the instantaneous efficiency of the device to remove the exhaust gas constituent from the exhaust gas, to initiate a subsequent rich operating condition when the first measure falls below a reference value, the subsequent rich operating condition being characterized by the combustion of a quantity of fuel in excess of a stoichiometric quantity of fuel sufficient to release substantially all of the additional amount of the exhaust gas constituent from the device, and to determine an ability of the device based on the quantity of excess fuel, wherein the reference value is significantly greater than a minimum value necessary to maintain the content of the exhaust gas constituent in the exhaust gas exiting the trap below a predetermined threshold level.

18. The controller of claim 17, wherein the reference value represents an efficiency of no less than about sixty-five percent.

* * * * *